US011228924B2

(12) United States Patent
Ronen et al.

(10) Patent No.: US 11,228,924 B2
(45) Date of Patent: Jan. 18, 2022

(54) METHOD OF CONTROLLING TRAFFIC IN A CELLULAR NETWORK AND SYSTEM THEREOF

(71) Applicant: CELLWIZE WIRELESS TECHNOLOGIES LTD., Tel Aviv (IL)

(72) Inventors: David Ronen, Kfar Saba (IL); Gal Izhaki, Haifa (IL); Dan Weil, Tel Aviv (IL)

(73) Assignee: CELLWIZE WIRELESS TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 17/281,801

(22) PCT Filed: Sep. 24, 2019

(86) PCT No.: PCT/IL2019/051053
§ 371 (c)(1),
(2) Date: Mar. 31, 2021

(87) PCT Pub. No.: WO2020/070739
PCT Pub. Date: Apr. 9, 2020

(65) Prior Publication Data
US 2021/0385670 A1 Dec. 9, 2021

Related U.S. Application Data

(60) Provisional application No. 62/739,917, filed on Oct. 2, 2018.

(51) Int. Cl.
*H04W 24/02* (2009.01)

(52) U.S. Cl.
CPC .................................. *H04W 24/02* (2013.01)

(58) Field of Classification Search
CPC ....................................................... H04W 24/02
See application file for complete search history.

(56) References Cited

U.S. PATENT DOCUMENTS 8,364,141 B1  1/2013 Kateley et al.
9,439,081 B1  9/2016 Knebl et al.
(Continued)

FOREIGN PATENT DOCUMENTS

WO  2012/055449 A1  3/2012
WO  2016/020917 A1  11/2016

*Primary Examiner* — Kyaw Z Soez
(74) *Attorney, Agent, or Firm* — Wiggin and Dana LLP; Gregory S. Rosenblatt; Thomas M. Landman

(57) ABSTRACT

There is provided a method and system to control traffic in a cellular network comprising a plurality of access points (APs) serving a plurality of user equipment devices (UEs). The method comprises: continuously obtaining data informative of NW KPIs derived from network data related to at least part of APs; continuously obtaining data informative of one or more UE KPIs derived from user equipment data related to at least part of the UEs; and processing the one or more NW KPIs together with the one or more UE KPIs to identify AP(s) requiring corrective action. The method can further comprise enabling, with regard to the identified AP(s), desirable corrective actions to improve the UE KPIs related to the identified AP(s) whilst to keep the NW KPIs related to the identified AP(s) as matching one or more predefined thresholds.

20 Claims, 8 Drawing Sheets

(56) References Cited

U.S. PATENT DOCUMENTS

| | | |
|---|---|---|
| 2013/0143542 A1 | 6/2013 | Kovvali et al. |
| 2015/0318945 A1* | 11/2015 | Abdelmonem ....... H04W 24/08 |
| | | 370/329 |
| 2015/0326447 A1 | 11/2015 | Yoon et al. |
| 2016/0381580 A1 | 12/2016 | Kwan |
| 2018/0242220 A1 | 8/2018 | Venkatraman et al. |
| 2019/0045370 A1* | 2/2019 | Al-Fanek .............. H04W 24/08 |
| 2021/0195443 A1* | 6/2021 | Agarwal ............... H04W 24/04 |

* cited by examiner

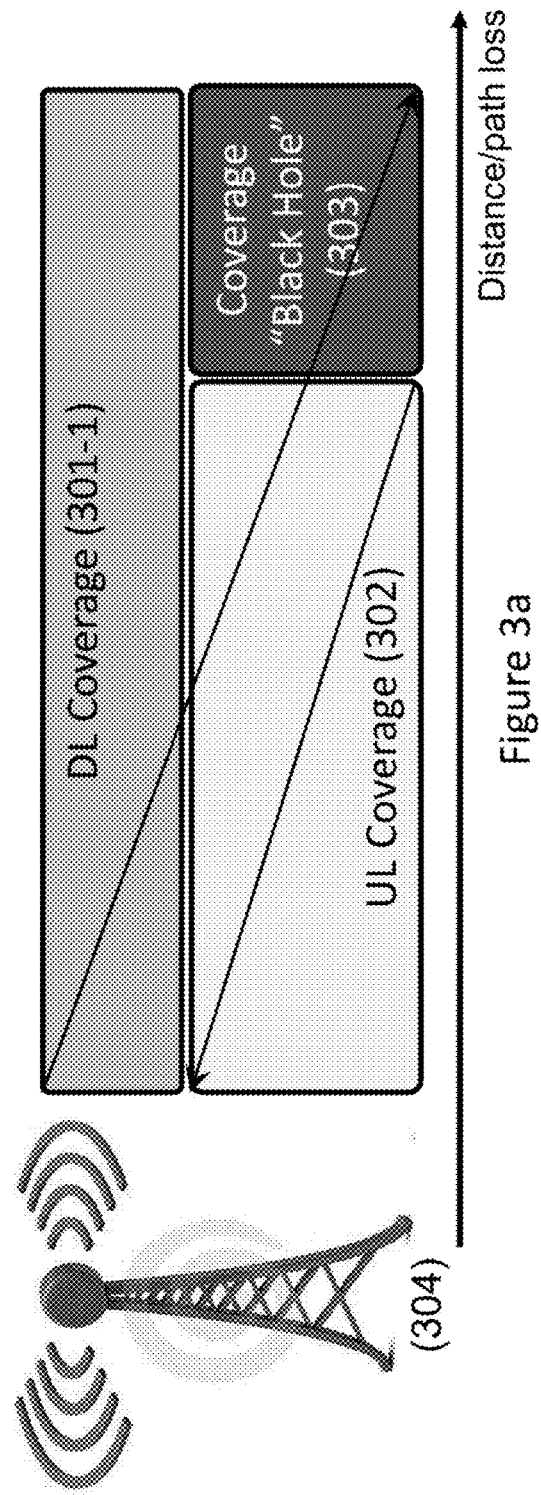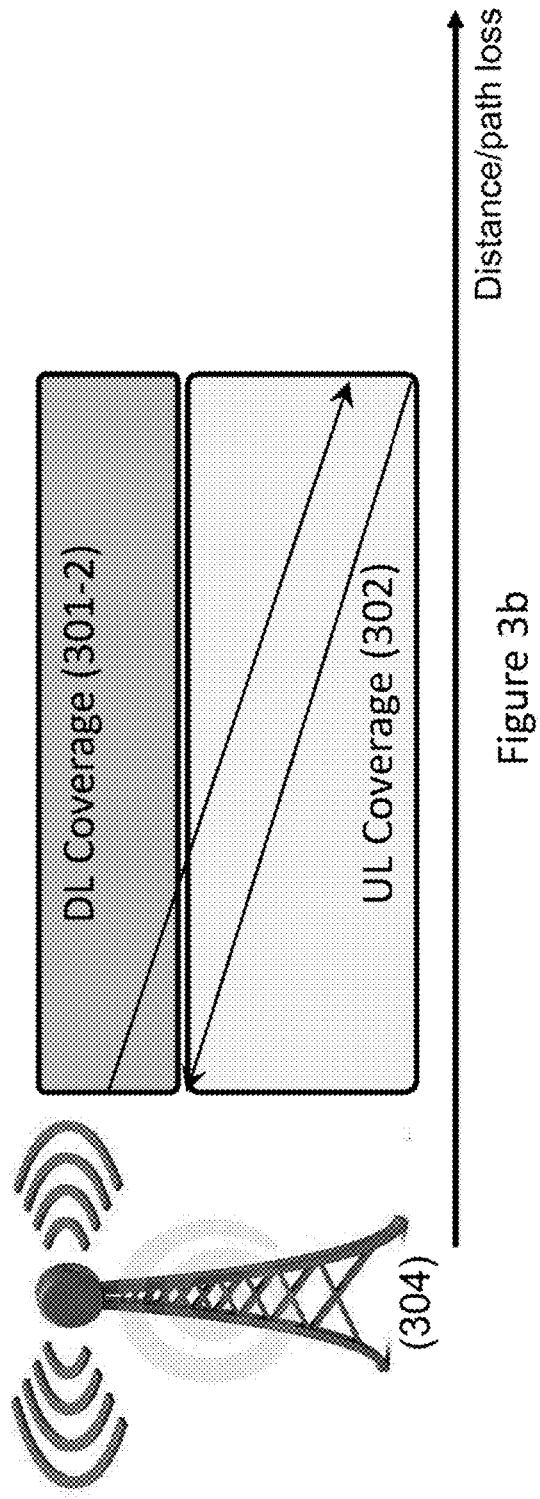
Figure 3a
Figure 3b

METHOD OF CONTROLLING TRAFFIC IN A CELLULAR NETWORK AND SYSTEM THEREOF

TECHNICAL FIELD

The presently disclosed subject matter relates generally to systems and methods of cellular communication and, in particular, to systems and methods of controlling quality of performance in a cellular network.

BACKGROUND

For today's complex cellular networks, Self-Organizing Network (SON) capabilities have become essential in order to configure, organize, optimise performance and/or provide self-healing if/when faults occur. The major aspects of SON technology are self-configuration, self-healing and self-optimization. Self-configuration enables access points (e.g. macrocells, picocells, femtocells base stations, eNBs, etc. and/or groups thereof) to become "Plug and Play" items. Among the aspects addressed by the self-healing capability are detection of cell degradation and respective self-recovery of software, self-healing; of board faults, cell outage recovery, and/or cell outage compensation, etc.

Once the system has been set up, operational characteristics of access points (APs) can be tuned by corrective actions, based on analyses of measurements data, thus enabling achievement of optimal network performance, coverage, and/or capacity by self-optimisation of the network. Self-optimization functions can include, for example, Load Balancing, Handover Optimization, Coverage & Capacity Optimization, Cell Outage Compensation, Energy Saving Management, etc. These optimization functions can change the coverage and capacity of a cell and, possibly, of surrounding cells, by configuring parameters (e.g. transmission power for downlink transmissions, antenna tilt, azimuth parameters, etc.) of the respective access point(s). Optionally, self-optimization functions can be aggregated into use cases (e.g. mobility load balancing (MLB), coverage and capacity optimization (CCO), and mobility robustness optimization (MRO)), which may be independent or may interact since they can operate on common control parameters.

Typically, corrective actions required for network optimization are based on current and desired (and/or threshold) Key Performance Indicators (KPIs). KPIs can characterize accessibility, retainability, integrity, mobility, availability and/or other quality characteristics as defined by respective cellular standards. A given KPI can be related to all communication services provided by a given AP, a group of APs and/or within a given location, or can be related to one or more selected communication-related services. Unless specifically stated otherwise, it is appreciated that throughout the specification the term "KPI" should be expansively construed to cover various statistical metrics including, but not limited to success metrics (e.g. throughput, call drop, etc.) and objective metrics.
General Description The inventors recognized that used in the art network-centric performance KPIs are poorly correlated to the actual users' experience, and that there is a need to consider KPIs indicative of services as received by the users.

In accordance with certain aspect of the presently disclosed subject matter, there is provided a method of controlling traffic in a cellular network comprising a plurality of access points (APs) serving a plurality of user equipment devices (UEs). The method comprises: continuously obtaining data informative of one or more network Key Performance Indicators (NW KPIs) derived from network data (NW data) related to at least part of the APs from the plurality of APs; continuously obtaining data informative of one or more user equipment Key Performance Indicators (UE KPIs) derived from user equipment data (UE data) related to at least part of the UEs from the plurality of UEs; and processing the one or more NW KPIs together with the one or more UE KPIs to identify at least one AP requiring corrective action.

The method can further comprise at least on of: reporting the at least one identified AP requiring corrective actions; identifying problems related to the at least one identified AP and alerting thereof; identifying one or more desirable corrective actions with regard to the at least one identified AP; and enabling desirable corrective actions with regard to the at least one identified AP.

The one or more NW KPIs and the one or more UE KPIs can be indicative of different characteristics related to network performance. Alternatively or additionally, the one or more NW KPIs can be indicative of network performance parameters, and the one or more UE KPIs can be indicative of experience of respective users.

In accordance with further aspects, the method can further comprise enabling, with regard to the identified at least one AP, one or more desirable corrective actions to improve the one or more UE KPIs related to the identified at least one AP whilst to keep the one or more NW KPIs related to the identified at least one AP as matching one or more predefined thresholds.

NW KPIs can be derived from the NW data aggregated in statistical clusters using a first aggregation criterion, and the UE KPIs can be separately derived from the UE data aggregated in statistical clusters using a second aggregation criterion different from the first aggregation criterion, the method can further comprise correlating between NW KPIs and UE KPIs prior to the processing the respective KPIs. The correlating can comprise identifying NW KPIs that correspond to APs involved in one or more services characterized by the UE KPIs. Optionally, the second aggregation criterion can be related to UEs located in one or more predefined geographical areas (e.g. corresponding to a highway or a railway) and/or related to UEs moving with a speed exceeding a predefined threshold.

In accordance with other aspect of the presently disclosed subject matter, there is provided a method of controlling traffic in a cellular network comprising a plurality of access points (APs) serving a plurality of user equipment devices (UEs), the method comprising: continuously obtaining network data (NW data) related to at least part of APs from the plurality of APs; continuously obtaining user equipment data (UE data) related to at least part of UEs from the plurality of UEs; processing the obtained NW data together with UE data to obtain one or more enhanced KPIs; and using the obtained one or more enhanced KPIs to identify at least one AP requiring corrective action.

The method can further comprise at least on of: reporting the at least one identified AP requiring corrective actions; reporting the one or more enhanced KPIs; identifying problems related to the at least one identified AP and alerting thereof; identifying one or more desirable corrective actions with regard to the at least one identified AP; and enabling desirable corrective actions with regard to the at least one identified AP.

Optionally, prior to the processing, the NW data and the UE data can be aggregated in combined statistical clusters with different weights for aggregating NW data and UE data.

The method can further comprise: aggregating NW data in NW statistical clusters and separately aggregating UE data in UE statistical clusters; and correlating between the NW statistical clusters and the UE statistical clusters, wherein the processing comprises processing together the correlated NW statistical clusters and the UE statistical clusters.

The processing can comprise: deriving one or more NW KPIs from the NW statistical clusters; deriving one or more UE KPIs from the UE statistical clusters; and deriving one or more enhanced KPIs, wherein at least one enhanced KPI is configured as a single value representing a weighted combination of one or more NW KPIs and respectively correlated one or more UE KPIs. A weight of the one or more UE KPIs in the at least one enhanced KPI can depend on a use case related to desirable corrective actions.

Alternatively or additionally, the processing can comprise: deriving one or more NW KPIs from the NW statistical clusters; deriving one or more UE KPIs from the UE statistical clusters; deriving one or more enhanced KPIs, wherein at least one enhanced KPI is configured as two values, one of the two values corresponding to the one or more NW KPIs and another of the two values, to respectively correlated one or more UE KPIs.

In accordance with other aspects of the presently disclosed subject matter, there is provided a method of controlling traffic in a cellular network comprising a plurality of access points (APs) serving a plurality of user equipment devices (UEs), the method comprises: continuously obtaining one or more UE KPIs indicative of failed connectivity attempts by at least part of the UEs from the plurality of UEs; processing the one or more UE KPIs to identify one or more first APs corresponding to one or more UE KPIs indicative of failed connectivity attempts exceeding a predefined threshold; and enabling corrective actions to improve the one or more UE KPIS indicative of failed connectivity attempts and related to the one or more identified APs. Optionally, at least part of the UE KPIs can be received by the computerized system from an external source.

Continuously obtaining the one or more UE KPIs can comprise: continuously collecting, by a computerized system, UE data related to at least part of the UEs from the plurality of UEs; and continuously deriving, by the computerized system, the one or more UE KPIs from the collected UE data. Optionally, the one or more UE KPIs can be derived by processing merely a part of the collected UE data selected in accordance with at least one of the following criteria: data corresponding to a predefined geographical area; data corresponding to predefined APs; data corresponding to geographical areas meeting predefined values of signal-strength indicative parameters; and data corresponding to predefined UEs, Optionally, at least part of the UE data can be collected with the help of active connectivity tests initiated from at least part of the UEs.

In accordance with further aspects, the method can further comprise: identifying, among the one or more first APs corresponding to location bins with UE KPI(s) indicative of failed connectivity attempts exceeding a predefined threshold, one or more second APs characterized by received signal strength meeting a predefined criterion; and enabling corrective actions to reduce downlink coverage of the identified location bins by the identified one or more second APs. Optionally, the one or more second APs can be identified with the help of processing the one or more UE KPIs together with NW KPIs corresponding to the one or more first Aps. Alternatively or additionally, the one or more second APs can be identified with the help of UE data received from UEs configured to store data indicative of received signal strength and report the stored data responsive to a predefined event that triggers UE data reporting.

In accordance with other aspects of the presently disclosed subject matter, there is provided a method of controlling traffic in a cellular network comprising a plurality of access points (APs) serving a plurality of user equipment devices (UEs), the method comprises: continuously obtaining one or more first UE KPIs characterizing commuting UEs with regard to one or more APs serving the commuting UEs; identifying at least one AP serving the commuting UEs and requiring corrective actions in accordance with the obtained one or more first UE KPIs; and enabling one or more corrective actions to improve performance of the at least one identified AP with regard to the commuting UEs whilst enabling that a performance averaged over all UEs served by the at least one identified AP meets a predefined criterion.

In accordance with further aspects, the method can further comprise continuously obtaining by the computerized system one or more NW KPIs with regard to the at least one identified AP, wherein performance of the at least one identified AP with regard to the commuting UEs is characterized by the one or more first UE performance averaged over all UEs served by the at least one identified AP is characterized by respective NW KPIs, and wherein the one or more corrective actions are enabled to improve the respective one or more first UE KPIs related to the at least one identified AP whilst to keep the respective NW KPIs related to the at least one identified AP as matching one or more predefined thresholds.

The continuously obtaining the one or more first UE KPIs characterizing commuting UEs can comprise: continuously collecting by the computerized system UE data related to at least part of the UEs from the plurality of UEs; using the collected data to identify the commuting UEs and continuously deriving the one or more first UE KPIs from the UE data collected from the commuting UEs. At least part of UE data can be collected with the help of active performance tests initiated from at least part of the UEs. At least part of the one or more first UE KPIs can be received by the computerized system from an external source.

In accordance with further aspects, the commuting UEs can be identified in accordance with at least one of the following criteria: UE location derived by the computerized system from UE data reported by UE to the computerized system; combination of UE location and speed derived by the computerized system from UE data reported by UE to the computerized system; and location and/or speed-related data of one or more 3rd party applications derived by the computerized system from UE data. reported by UE to the computerized system.

In accordance with further aspects, performance of the at least one identified AP with regard to the commuting UEs can be characterized by the one or more first UE KPIs, performance averaged over all UEs served by the at least one identified AP can be characterized by one or more second UE KPIs derived from UE data received from UEs configured to store and report data indicative of received signal strength; and the one or more corrective actions can be enabled to improve the respective one or more first UE KPIs related to the at least one identified AP whilst to keep the one or more second UE KPIs related to the at least one identified AP as matching one or more predefined thresholds.

In accordance with other aspects of the presently disclosed subject matter, there is provided a computerized system configured to perform at least one of the methods above.

In accordance with other aspects of the presently disclosed subject matter, there is provided a computer program product implemented on a non-transitory computer usable medium and comprising computer readable program code for performing at least one of the methods above.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3a and 3b illustrate a schematic diagram representing the problem of "access black hole";

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "enabling", "reporting", "alerting", "generating", "obtaining", "identifying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the SON system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Figure 1A:
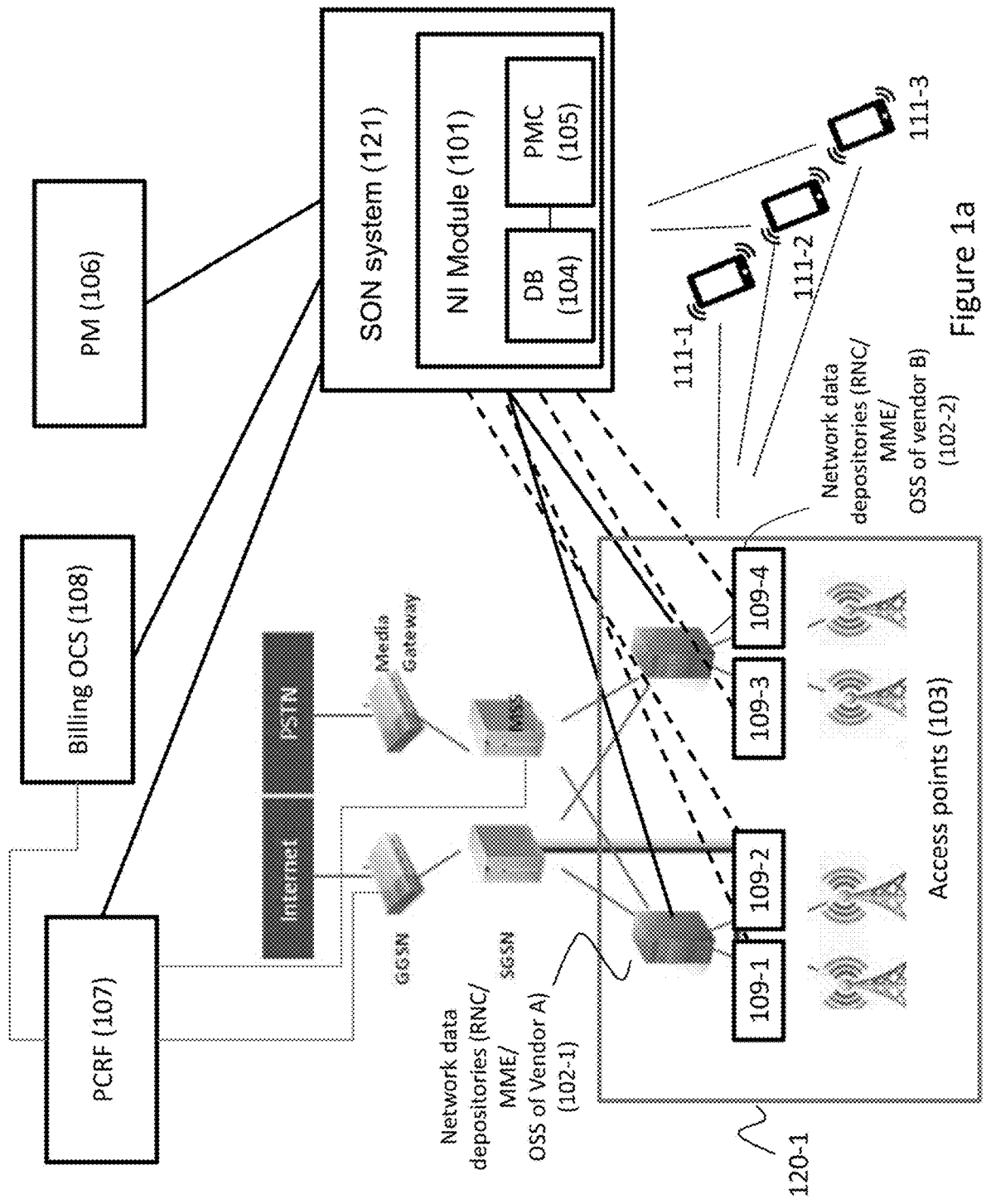
FIGS. 1a-1b illustrate exemplified generalized cellular network environments including a SON system configured in accordance with certain embodiments of the presently disclosed subject matter.
Figure 1B:
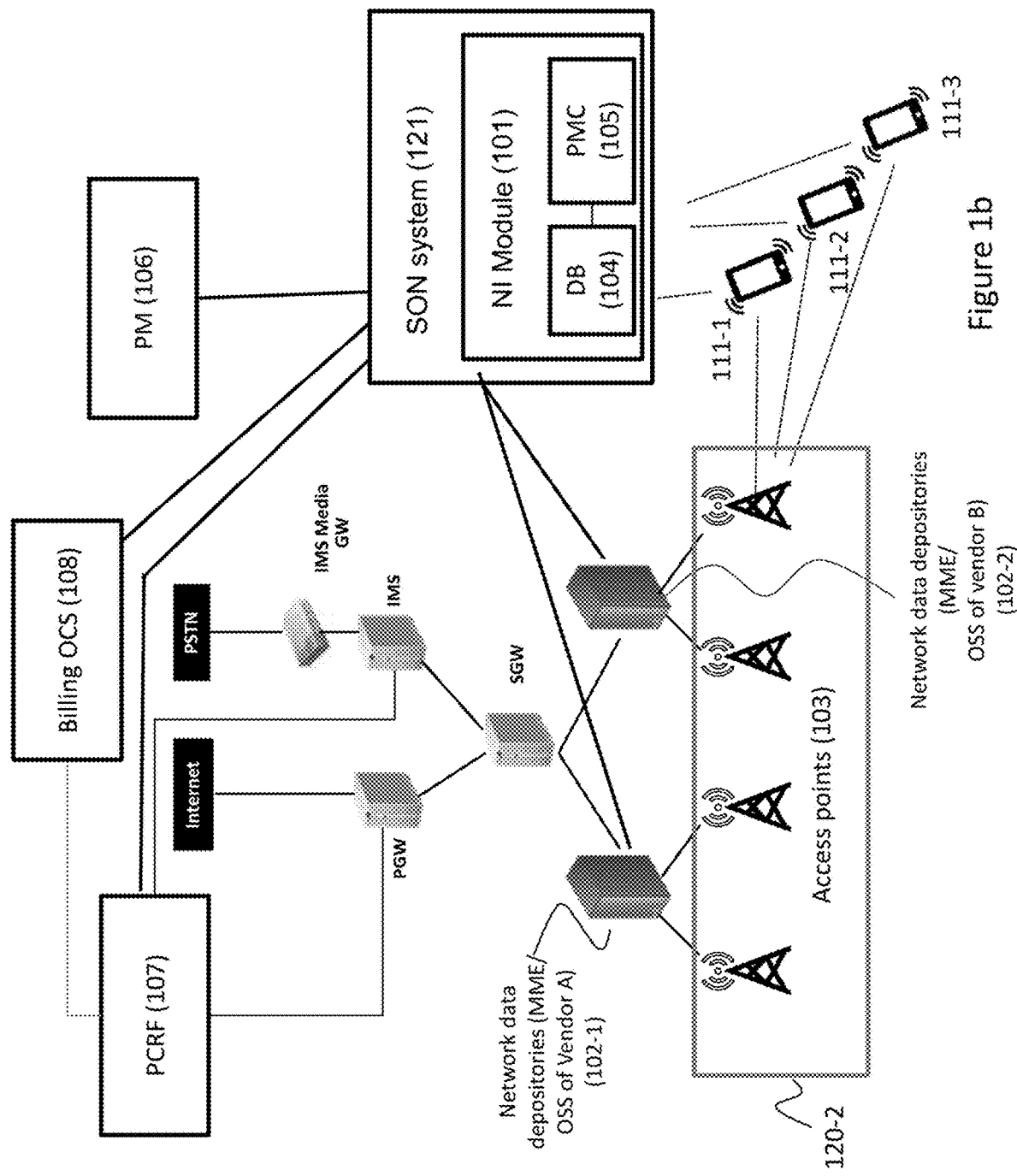

Bearing this in mind, attention is drawn to FIGS. 1a and FIGS. 1b illustrating non-limiting examples of cellular network environment including a SON system 121 configured in accordance with certain embodiments of the presently disclosed subject matter. FIG. 1a illustrates a generalized 3G network environment, and FIG. 1b illustrates a generalized environment of LTE or 5G cellular networks. The exemplified network environments illustrated in FIGS. 1a and 1b comprise a radio access network (RAN) denoted 120-1 for 3G network in FIG. 1a and 120-2 for LTE network in FIG. 1b. RAN comprises a plurality of access points (e.g. macrocells, picocells, femtocells base stations, eNBs, etc. and/or groups thereof) denoted as 103-1-103-4. The access points can operate in different bands and/or RATs (Radio Access Technologies) and can be provided by different vendors. The access points (APs) serve a multiplicity of user equipment devices (UEs) being in operating or in idle modes. The UEs are configured to communicate with APs via radio frequency (RF) channels allowing bidirectional transmission of voice and/or data between the APs and UEs in accordance with respective cellular standards. It is noted that the tenor "user equipment devices" should be expansively construed to cover any end-device (e.g. mobile phones, IoT devices, telematic units, etc.) having capability to communicate with APs in accordance with respective cellular protocols SON system 121 can be connected (by direct connection or through a mediation layer as, for example, OSS server) to access points 103 (connections not shown for simplicity of illustration). The SON system can be configured to enable corrective actions (e.g. self-configuring, self-optimizing and/or self-healing, etc.) with regard to one or more access points in accordance with data related to the network environment and obtained by the SON system. As will be further detailed with reference to FIG. 2, SON system 121 can comprise a Network Information (NI) Module 101 configured to collect and process data related to the network environment. NI module 101 comprises a memory 104 operatively coupled to a processor and memory circuitry (PMC) 105 configured to enable operations as detailed with reference to FIGS. 2-7. PMC 105 comprises a processor (not shown separately) operatively coupled to a memory (not shown separately). Memory 104 is configured to accommodate a database configured to store the collected data and the results of processing thereof.

Network Information (NI) module 101 is operatively connected to one or more network depositories denoted as 102-1 and 102-2. Optionally, some of the network depositories can be provided by different vendors. Unless specifically stated otherwise, any depository of data received from the plurality of APs (directly, via probe devices and/or otherwise) is referred to hereinafter as a network data (NI)) depository. By way of non-limiting example, in a 3G environment such depositories can be located at Radio Network Controller(s) (RNC), OSS (Operation and Support System) servers, etc. By way of another non-limiting example, in LTE environment such depositories can be located at OSS servers and/or at MME. The NI module (101) can be further operatively connected to a Performance Management (PM)

node (106) and, optionally, to a Policy and Charging Rules Function (PCRF) node (107), billing system (108) and/or other client-related system.

The NI module is configured to continuously collect RAN-related data from one or more ND depositories. RAN-related data can be informative of network performance (including resource utilization). By way of non-limiting example, RAN-related data can be informative of Reference Signal Received Power (RSRP), Reference Signal Received Quality (RSRQ), Received Signal Strength Indication (RSSI), Signal-Noise Ratio (SNR), Channel Quality Indicator (CQI), mobility-related KPIs such as Handover Success Rate and Dropped Call Rate (DCR), performance KPIs such user throughput, network accessibility KPIs, etc. Optionally, RAN-related data can be derived from various data records (e.g xDR, where x stands for Call/Transaction/Session) collected from ND depositories and informative of network performance.

Alternatively or additionally to receiving data collected in one or more NI) depositories, the NI module can be configured to continuously collect RAN-related data from a plurality of probe devices. The probe devices are denoted as 109-1-109-4 in FIG. 1a (and are not shown in FIG. 1b for simplicity of illustration). The probe devices are connected to the respective access points to sniff and/or monitor traffic (e.g. between the access points and the MME). The NI module can receive data directly from the probe devices (e.g. as illustrated for the probe devices 109-3 and 109-4) or via a network depository (e.g. as illustrated for the probe devices 109-1 and 109-2). Optionally, the NI module can continuously receive data collected by the probe devices in near real-time mode, independently of collection periods of the network depositories.

RAN-related data and/or derivatives thereof received from the ND depositories and/or probe devices and/or directly from the plurality of access points are referred to hereinafter as network (NW) data. It is noted that RAN-related data are collected in association with data indicative of respective APs. KPIs corresponding to NW data and respective association thereof are referred to hereinafter as NW KPIs. Such KPis can be received by the NI module from network entities (e.g. PM node 106) and/or obtained by processing NW data collected by the NI module.

NI module 101 can be configured to store the obtained NW data and, optionally, NW KPIs in the database accommodated on the memory 104. Optionally, the NI module can be further configured to receive and store in the database data informative of network topology, including geolocation and configuration of access points.

In accordance with certain embodiments of the presently disclosed subject matter, SON system 121 (e.g. NI module therein) can be further configured to operatively communicate with a plurality of UEs (denoted as 111-1-111-3) and to continuously collect data therefrom. The plurality of UEs can include some or all UEs of the multiplicity of UEs served by the plurality of APs UE 111 can be configured to continuously report (directly or via other network entities) to SON system 121 data informative, at least, of RAN-related measurements provided by UE 111 in accordance with respective cellular standards.

RAN-related measurements can be related to (and associated with) a serving AP and one or more surrounding APs (not necessarily included in a neighbouring list of the serving cell) and/or locations associated thereof. For example, RAN-related measurements can include RRC measurements provided by UEs for RRC (Radio Resource Control) measurement reports in accordance with 3G or higher standards. By way of non-limiting example, data informative of RAN-related measurements can include RSRP, RSRQ, RSSI, CQI, data throughput, latency, packet loss, etc. Alternatively or additionally, RAN-related measurements can include measurements which are not included in RRC reporting (e.g. call-drop indications, reasons the calls were dropped, etc.)

In accordance with certain embodiments of the presently disclosed subject matter, further to data informative of RAN-related measurements, UE 111 can be configured to continuously report, and SON system 121 can be configured to continuously collect data informative of UE location and, optionally, of other context-related data (and/or derivatives thereof) obtained using various sensors of the UE (e.g. gyroscope, accelerometer, GPS, etc. and/or applications running on UE. By way of non-limiting example, context-related data can include battery level threshold, battery charge rate of change, predicted location of UE based on UE mobility and/or UE calendar information, calendar information, alarm information, application data from an application running on the UE, type of UE (e.g. smartphone, IoT item, etc.), name of mobile operator, environment-related status e.g. indoor, outdoor, driving, walking, etc.), etc.

Optionally, UE 111 can be configured to process at least part of data informative of RAN-related measurements and/or context-related data and to send the respective derivatives to NI module 101. By way of non-limiting example, UE 111 can be configured to reveal a violation and/or near violation of a SLA (Service Level Agreement) stored in the UE and to send the respective alert to NI module 101.

Unless specifically stated otherwise, it is appreciated that throughout the specification the terms "continuously collecting data by the SON system", or the like refer to receiving (in push or pull mode) data substantially each time new data is available to the SON system. For example, in "push" mode, the availability of new data in the system can be defined by a period specified as collection time and/or reporting time for a given ND depository, UE, etc., by availability of connection with a given UE, by predefined "push" events (e.g. events specified in the cellular network for providing RRC measurements, events of SLA. violations, events specified by NI module for UE reporting, etc.), etc. In "pull" mode, the availability of new data can be defined by configuration of the NI module specifying when to pull the data. Likewise, the terms "continuously obtaining" "continuously reporting", "continuously generating", "continuously providing" and the like, refer to actions (of NI module, SON system and/or UE) provided in accordance with a certain arrangement related to new data availability. For example, such actions can be provided in near real-time mode, responsive to predefined events, etc. It is noted that, unless specifically stated otherwise, the term "predefined events" should be expansively construed to cover also scheduled events and/or events occurring in accordance with predefined periodicity.

Throughout the specification the term "UE data" is referred to data obtained from UEs (e.g. RAN-related data, context-related data, etc.) and/or derivatives thereof. UE data can be collected. by SON system from the plurality of UEs. Alternatively or additionally, UE data can be received by the SON system from other network entities (e.g. from an operator's big data repositories) and/or external entities (e.g. from applications collecting geo-indicated data from UEs). It is noted that UE data are collected in association with data indicative of respective APs and, optionally, with geolocation of UEs (and/or other context) when they obtained and/or reported the respective data. KPIs corresponding to UE data and respective associations thereof are referred to hereinafter as UE KPIs. Such KPIs can be received from other entities and/or obtained by processing UE data by the SON system.

NI module 101 can be configured to store the obtained UE data and UE KPIs in the database accommodated on memory 104.

In accordance with certain embodiments of the presently disclosed subject matter, each UE 111 from the plurality of UEs is configured to run a software agent (referred to hereinafter as UE agent). UE agent can be configured to enable reporting UE data to SON system 121, wherein UE data can be collected by the agent from respective sensors and/or data repositories comprised in UE and/or applications running on UE. Optionally, UE agent can be further configured to cause UE to store there within operational data obtained by OS (e.g. data indicative of signal strength, data indicative of running applications, etc.) and/or other context-related data for further reporting and/or analyses. Further, UE agent can be configured to cause UE to provide active network-related measurements. By way of non-limiting example, UE agent can cause UE to send and/or receive a test data and to measure (and further report) respective performance characteristics (e.g. packet loss, throughput, latency, etc.).

By way of non-limiting example, UE agent can be implemented as an SDK to a mobile OS (e.g. Android), thus enabling access to network and device performance and context information obtained and/or collected by the UE; an application having access to the respective information and built with the help of SDK and/or API provided by a device manufacture or by $3^{rd}$ party application; etc. Operational parameters (e.g. when and what data to obtain, collect and/or report) of UE agent can be configurable by SON system 121.

Those versed in the art will readily appreciate that the teachings of the presently disclosed subject matter are not hound by the network environments illustrated in FIGS. 1a and 1b, and can be implemented in other network architectures and/or standards.

Figure 2:
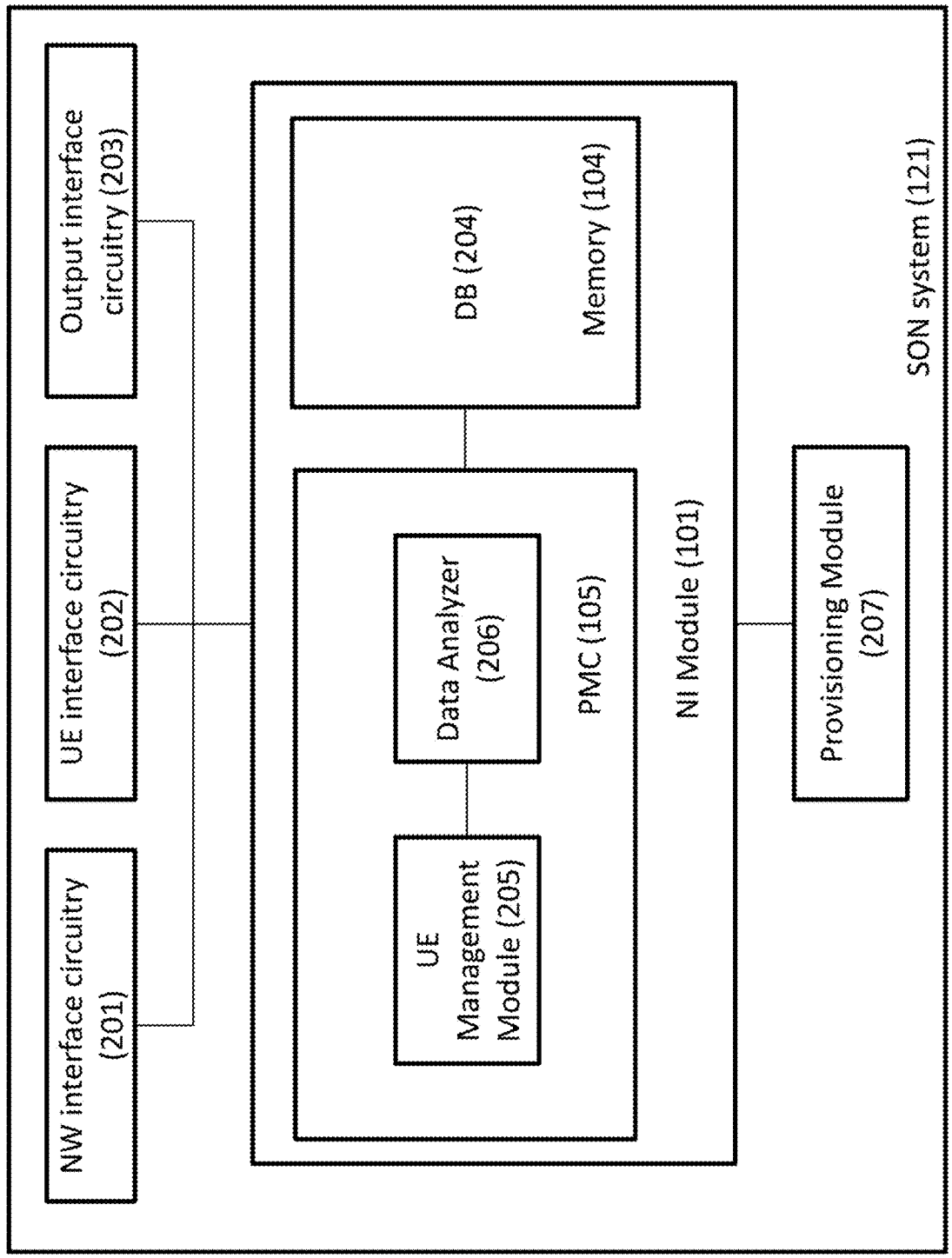
FIG. 2 illustrates a generalized block diagram of the SON system in accordance with certain embodiments of the presently disclosed subject matter.

Referring to FIG. 2, there is illustrated a generalized block diagram of SON system 121 in accordance with certain embodiments of the presently disclosed subject matter. The SON system comprises NI module 101 operatively coupled to interface circuitry 201 (e.g. one or more ports), interface circuitry 202, output interface circuitry 203 and provisioning module 207. The SON system can further comprise a graphical user interface (not shown) enabling user-specified inputs related to its operation.

Interface circuitry 201 is configured to enable bidirectional data communication necessary for continuously receiving NW data and/or NW KPIs, and interface circuitry 202 is configured to enable bidirectional data communication necessary for continuously receiving UE data and/or UE KPIs. Interface circuitries 201 and 202 are further configured to forward the received data and/or derivatives thereof to NI module 101 which comprises PMC 105 and memory 104 operatively coupled to the PMC. PMC 105 is configured to provide necessary processing of the received and/or stored data in accordance with the operations further detailed with reference to FIGS. 3-7. PMC 105 is further configured to accommodate all thresholds, criteria and predefined rules, policies, training sets and alike detailed with reference to FIGS. 3-7. It is noted that, optionally, PMC 105 can be shared with and/or incorporated in other modules in the SON system.

Provisioning module 207 is configured to generate provisioning scripts (and/or select pre-provisioned scripts) in accordance with the results of NI module's processing and enable respective corrective actions (e.g. using OSS NBI and/or other network-provided. APIs/NBIs, including changes therein). Output interface circuitry 203 is configured to forward the respective provisional scripts to relevant network entities.

PMC 105 can be configured to execute several functional modules in accordance with computer-readable instructions implemented on a non-transitory computer usable medium therein. Such functional modules are referred to hereinafter as comprised in the PMC.

In accordance with certain embodiments of the presently disclosed subject matter, PMC 105 can comprise such operatively connected functional modules as UE management module 205 and data analyser 206.

UE management module 205 is configured to communicate (directly or via other network entities) with the plurality of UEs 111 via interface circuitry 202. In accordance with certain embodiments of the invention, NI module UE management module 205) can communicate with each UE agent running on a given UE of the plurality of UEs.

UE management module 205 is configured to maintain one or more policies specifying parameters of data communication between NI module and the plurality of UEs. By way of non-limiting example, such parameters can define (optionally in dependency, at least, on time and/or UE location) UE data to be measured and/or reported time window and/or location for UE data collection and/or reporting; predefined events triggering UE data reporting, etc. The policies can be edited by a user (a person via GUI or an external application via API). UE management module can be configured to download to each given UE from the plurality of UEs a respective policy and to provide periodic updates of the agent and/or downloaded policies. A given UE (with the help of UE agent running thereon) provides UE data to NI module 101 in accordance with the respectively received policy. It is noted that NI module 101 can provide different policies to different UEs.

As will be further detailed with reference to FIGS. 2-7, data analyser 206 can be configured to process the collected NW and/or UE data to derive, in consideration of UE data, KPIs indicative of network performance (and/or other data usable for corrective decisions) and to forward the results to the provisioning module 207 and/or to the database 204.

Those skilled in the art will readily appreciate that the presently disclosed subject matter is not bound by the configuration of FIG. 2; equivalent and/or modified functionality can be consolidated or divided in another manner and can be implemented in any appropriate combination of software with firmware and hardware. In some embodiments, NI module 101 can be implemented as one or more standalone entities operating in conjunction with the SON system, or can be integrated, fully or partly, with other network entities (e.g. OSS, etc.). Optionally, at least part of functionality of NI module 101 can be implemented in a cloud and/or distributed arrangement (e.g. functions of collecting UE data, providing policy updates, etc.).

UE data and/or UE KPIs obtained by SON system 121 are usable for a variety of use cases.

By way of non-limiting example. UE data are usable for uplink/downlink balancing and, thereby, solving the problem of "access black hole". As schematically illustrated with reference to FIG. 3a, due to configuration and/or physical properties of AP 304, its uplink. coverage 302 can be less than downlink coverage 301-1. Unavailable uplink together with downlink matching to operational signal strength requirements lead to a connectivity problem unrecognizable by the network, and is referred to as an "access black hole".

For example, as defined by respective standards, LTE provides UE with a separate PRACH channel (Physical Random Access Channel) necessary to perform Random Access Procedure. Such a procedure is required for initial access from idle state, connection re-establishment procedure, etc. Accordingly, an idle UE located in "black hole" area 303 is incapable to access AP 304, whilst NW data related to AP 304 comprise no indication of such a connection problem. Accordingly, a user in a "black hole" area (typically at the edge of coverage of AP 304) is incapable of initiating a voice and/or data service.

The "access black hole" is the use case solvable with the help of the SON system configured in accordance with certain embodiments of the presently disclosed subject matter. The respective operation of SON system 121 is illustrated with reference to FIG. 4.

SON system (e.g. NI module 101) processes collected UE data to obtain (401) UE KPI(s) indicative of failed connectivity attempts (referred to hereinafter as "connectivity UE KPIs"). It is noted that UE data are collected in association with data indicative of geolocation of respective UEs when they obtained the respective data. Optionally, NI module 101 can process only part of the collected UE data (e.g. corresponding to certain geographical areas and/or certain APs/parameters thereof and/or certain UEs). By way of non-limiting example. NI module can, prior to processing (401), identify edges of respective APs' coverage (e.g. corresponding to UEs reporting RSRP <11.0 dbm) and process only data collected from the respective locations. It is noted that data indicative of failed connectivity attempts can be reported when respective UEs leave the "access black hole area". Optionally, UE data indicative of failed connectivity attempts can be received with the help of the UE agent configured to provide active connectivity tests (e.g. by sending ICMP (ping) requests).

Processing (401) can comprise clustering the collected data (e.g. per location bins) and separately processing each cluster and/or group thereof. It is noted that each processed cluster (or group thereof) shall comprise a statistically sufficient amount of data enabling desired statistical confidence (e.g. 70-99% depending on the requirements of the network operator). By way of non-limiting example, the statistically sufficient amount of data can be achieved by tuning the duration of the collection period, aggregating the collected UE data together with prior obtained UE data stored in database 204, using the stored UE data to generate a statistical baseline, etc.

Alternatively or additionally, UE KPI(s) indicative of failed connectivity attempts can be received by SON system 121 from an external source.

SON system (e.g. NI module 101) uses the obtained UE KPIs to identify (402) location bins characterized by UE "connectivity KPIs" that do not match a predefined threshold (e.g. UE KPIs indicative of the number of access failures exceeding a predefined value). Further, SON system (e.g. NI module 101) identifies (403) AP(s) corresponding to the identified problematic location bins. By way of non-limiting example, correlation between location bins and APs can be provided using data informative of network topology and/or using UE data associated both with serving/neighbouring APs and UE locations.

Among the identified APs, SON system identifies (404) APs with the "access black hole" problem, i.e. characterized by areas with unavailable uplink whilst having downlink that matches operational signal strength requirements.

In certain embodiments such AP(s) can be identified using the obtained UE KPIs together with NW KPIs so to identify AP(s) matching both of the following criteria:
1) APs corresponding to identified location bins;
2) APs characterized by NW KPIs indicative that respective downlinks match operational signal strength requirements.

In another embodiments, AP(s) with the "access black hole" problem can be identified by processing merely the collected UE data. In such embodiments, the UE agent can be configured to cause UEs to store and, responsive to a predefined event triggering UE data reporting, to report data indicative of received signal strength. By way of non-limiting example, such an event can be a successful connection attempt, scheduled reporting event, or any other suitable event configured by the policy. Accordingly, the SON system uses such data to identify (404) APs with "access black hole" as APs corresponding to identified location bins, whilst enabling received signal strength corresponding to normal downlink operation.

Upon identifying APs with "access black holes", the SON system enables corrective actions to reduce (405) downlink covering the identified location bins by identified APs (e.g. by gradually adjusting parameters of the identified APs, e.g. antenna tilt and/or minimum signal strength for UE during cell selection (for example, QRXLEVmin). Optionally, the SON system can further enable adjusting (406) parameters of neighbouring APs, if necessary, for providing desired coverage of the "access black hole" location.

Following the adjustment, NI module 101 processes updated collected UE data to obtain (407) updated UE KPIs (and, optionally, updated NW KPIs) characterizing the identified APs.

NI module 101 repeats operations 403-405 until a completion criteria is met. Optionally, NI module 101 can repeat operations 402-405 until meeting the completion criteria. By way of non-limiting example, the completion criteria for a given A.P can be met when the updated KPI(s) meet respectively predefined thresholds. FIG. 3*b* illustrates AP 304 with downlink (301-2) coverage adjusted as above (covering the "access black hole" area by neighbouring APs is not shown for simplicity of illustration). It is noted that operations 401-405 can be provided in near real-time mode. It is further noted that NW KPI(s) can be used as a feedback before beginning a next cycle of operations 403-405 (or 402-405).

By way of another non-limiting example, UE KPIs are usable for improving quality of services for commuting users. As the number of stationary users is, typically, a significantly larger number than the number of commuting users served by a certain AP, averaged KPI-based AP optimization is focused towards the stationary users, and the problems experienced by commuting users can be overlooked.

Figure 5:
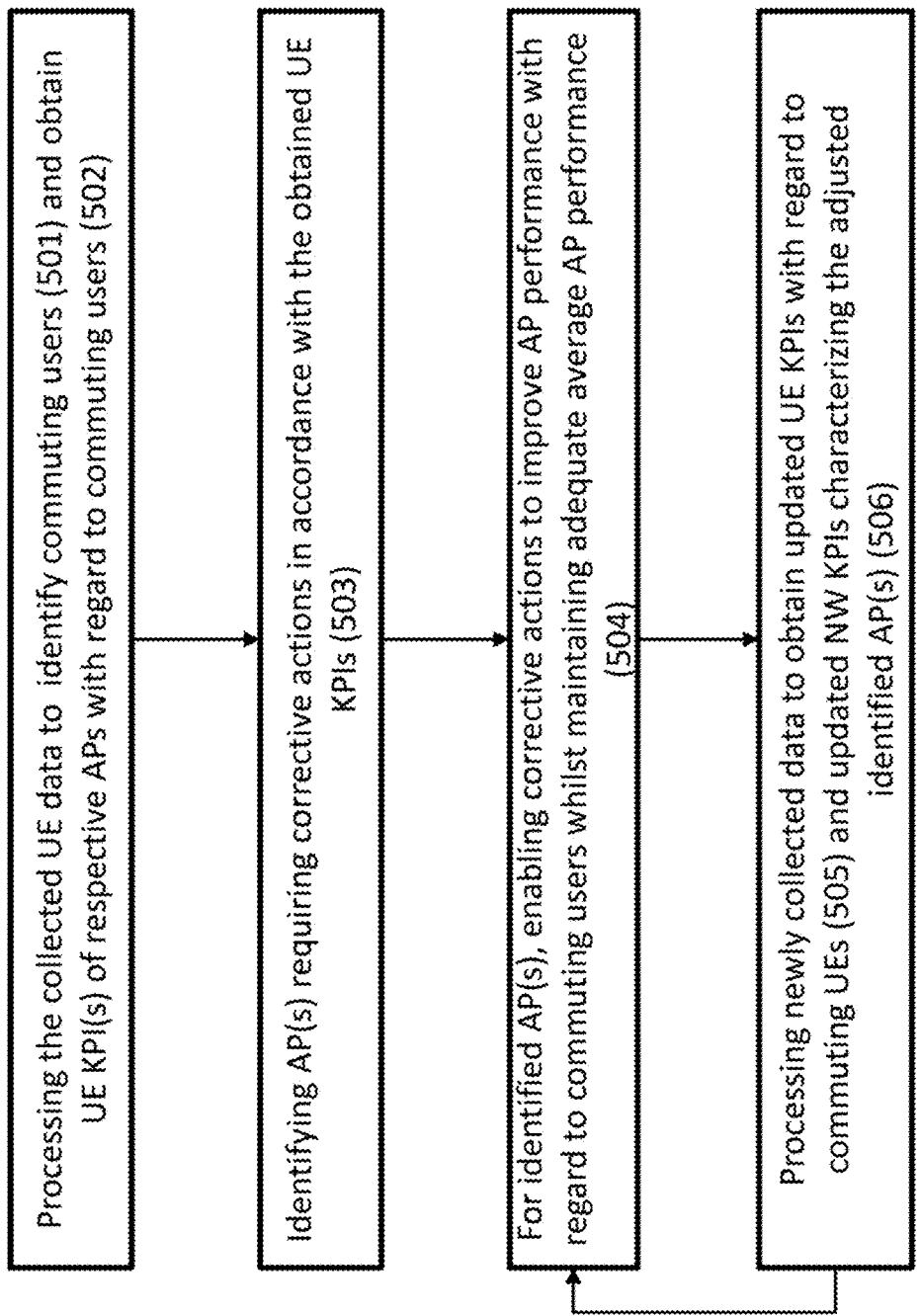
FIG. 5 illustrates a generalized flow diagram of a non-limiting example of operating the SON system in accordance with certain embodiments of the presently disclosed subject matter in a "road" use case.

As illustrated in FIG. 5, SON system (e.g. NI module 101) processes collected UE data to identify (501) UEs associated with currently commuting users and obtains (502) UE KPIs of respective serving APs with respect to the identified commuting UEs. By way of non-limiting example, such UEs can be identified in accordance with reported location (e.g. if location accuracy is enough to distinguish between a highway and surrounding area), combination of reported location and speed derived from the reported UE data, data of $3^{rd}$ party applications (e.g. Waze, Google Maps, etc.) derived from the reported UE data, etc. Likewise in the other use cases, NI module 101 can process only part of the collected UE data (e.g. corresponding to certain geographical areas and/or certain AP/parameters thereof and/or certain UEs, etc.).

SON system 121 uses the obtained UE KPIs to identify (503) APs requiring corrective actions in view of insufficient quality of service (e.g. insufficient reliability, retainability, latency, etc.) provided for commuting UEs. For the identified APs, SON system 121 enables (504) corrective actions (e.g. gradually adjusting AP parameters) to improve APs' performance with regard to commuting users whilst maintaining adequate averaged AP performance. Thus, the corrective actions can be provided so as to improve UE KPIs related to the identified APs, whilst keeping respective NW KPIs as matching one or more predefined thresholds.

Current averaged performance of a given AP can be defined with the help of NW KPI(s) characterizing the given AP and/or with the help of UE KPIs derived from UE data (including stationary UEs) associated with the given AP. Following the adjustment, NI module 101 processes (505) the updated aggregated NW data to obtain updated NW KPIs characterizing the adjusted identified AP(s) and processes updated UE data to obtain updated UE KPIs with regard to commuting UEs. Alternatively, NI module 101 can obtain enhanced KPIs further detailed with reference to FIG. 7, each enhanced KPI informative of both updated NW KPIs and updated UE KPIs. UE KPI within the enhanced KPI can be weighted to emphasise the impact of commuting users' experience on the AP performance metrics.

SON system 121 repeats operations 504-506 until a completion criteria is met. By way of non-limiting example, the completion criteria can be met when both updated NW KPI(s) and updated UE KPI(s) with regard to commuting UEs meet respectively predefined thresholds.

It is noted that operations 501-506 can be provided in near real-time mode.

Among advantages enabled for the use case disclosed with reference to FIG. 5 is capability of significant improvement of service for commuting users, whilst affordable (and, in many cases, unnoticeable) degradation of service for static users.

Figure 6:
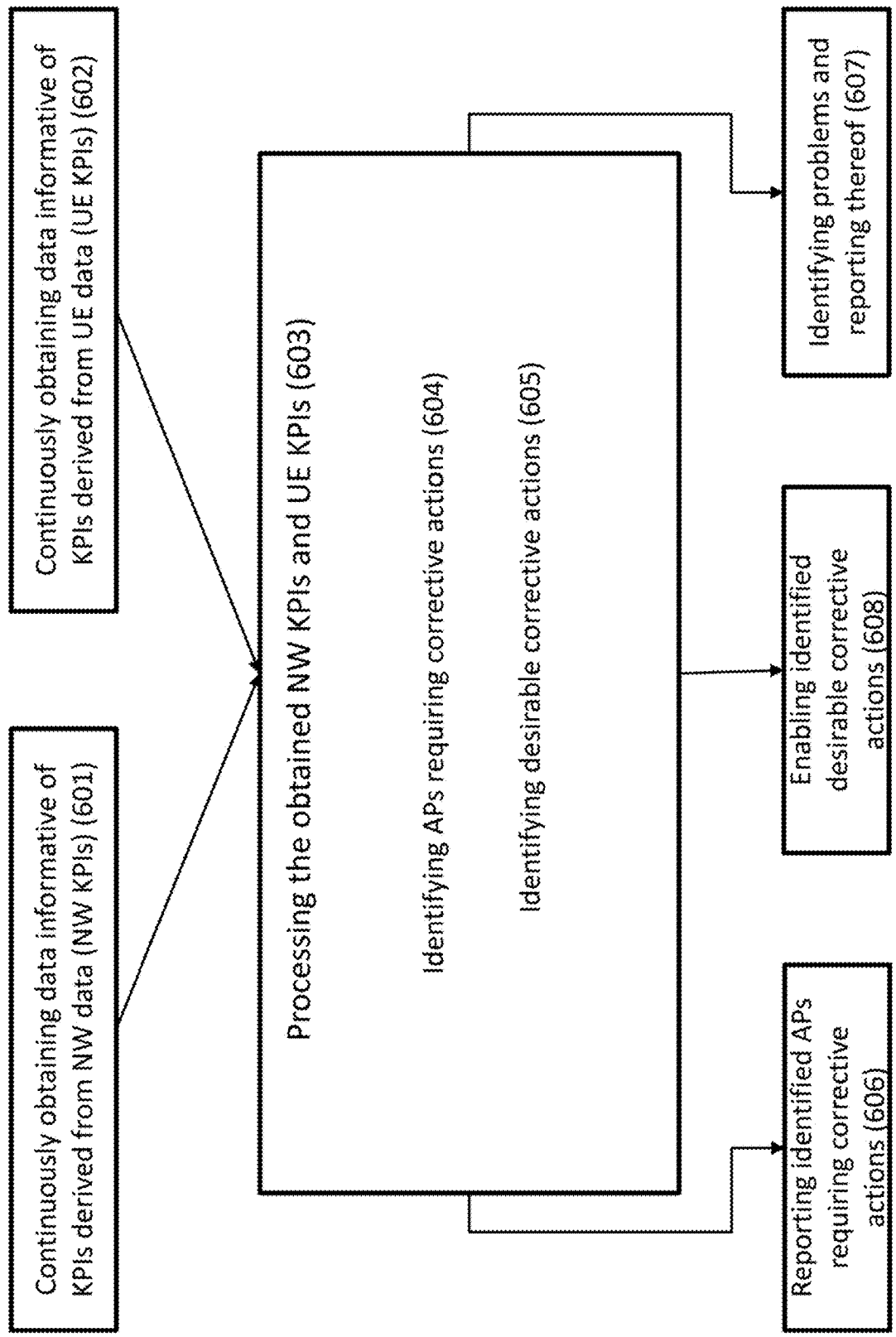
FIG. 6 illustrates a generalized flow diagram of operating the SON system in accordance with certain embodiments of the presently disclosed subject matter.

Referring to FIG. 6, there is illustrated a generalized flow chart of operating the SON system, in accordance with certain embodiments of the presently disclosed subject matter, SON system (e.g. NI module) continuously obtains (601) data informative of NW KPIs and continuously obtains (602) data informative of UE KPIs. Such data can be received from different entities (e.g. external crowdsourcing applications collecting the respective data). Alternatively or additionally, SON system can obtain at least part of KPI-informative data by separate processing NW and UE data collected therein. Collecting NW and UE data is further detailed with reference to FIG. 7.

SON system processes (603) the obtained UE KPIs (optionally, together with NW KPIs) to identify (604) APs that require corrective action and, optionally, to identify (605) desirable corrective actions. In certain embodiments, desirable corrective actions can be the corrective actions that enable improving the one or more UE KPIs related to the identified APs, whilst keeping respective NW KPIs as matching one or more predefined thresholds.

Further, SON system can report (606) such identified APs (e.g. to OSS or other appropriate network entities), identify problems with identified APs, and alert (607) about identified problems, enable the identified desirable corrective actions (608) and/or can provide other reporting or actions related to the required correction of the identified APs.

In certain embodiments, aggregation criteria of statistical clusters usable for deriving NW KPIs can differ from aggregation criteria of statistical clusters usable for deriving UE KPIs. By way of non-limiting example, NW KPI can be derived from NW data aggregated in statistical clusters per cell (or groups thereof), while UE KPIs can be derived from UE data aggregated in statistical clusters per geographical areas (e.g. location bins and/or groups thereof). For example, a geographical area can correspond to, at least, part of a highway or railway or to another territory of interest (e.g. enterprise, convention centre, etc.). Alternatively or additionally, an aggregation criterion can be related to a speed of UEs moving (e.g. statistical clusters can include only UEs located in a geographical area corresponding to a highway/railway and moving with a speed exceeding a predefined threshold).

In such embodiments processing (603) can comprise correlation between NW KPIs and UE KPIs prior to processing the respective KPIs. Correlation, for example, can include identifying NW KPIs that correspond to APs involved in services characterized by UE KPIs. By way of non-limiting example, such correlation can be provided using data informative of network topology and/or UE data associated both with serving/neighbouring APs and UE locations. Optionally, data in statistical clusters for NW KPIs and/or UE KPIs can be further aggregated by type of UE, time of day, services, predefined use cases (e.g. uplink/downlink balancing, hotspots identification, LTE footprint optimization, etc.), etc.

Alternatively or additionally, NW KPIs and UE KPIs can be indicative of different characteristics related to the network performance. By way of non-limiting example, while NW KPIs can be indicative of network performance parameters (e.g. number of call drops, latency, etc.), respective UE KPIs can be indicative of a user's experience (e.g. number of UEs which suffered from call drops, number of UEs with a certain service which suffered from high latency, etc.).

Figure 7:
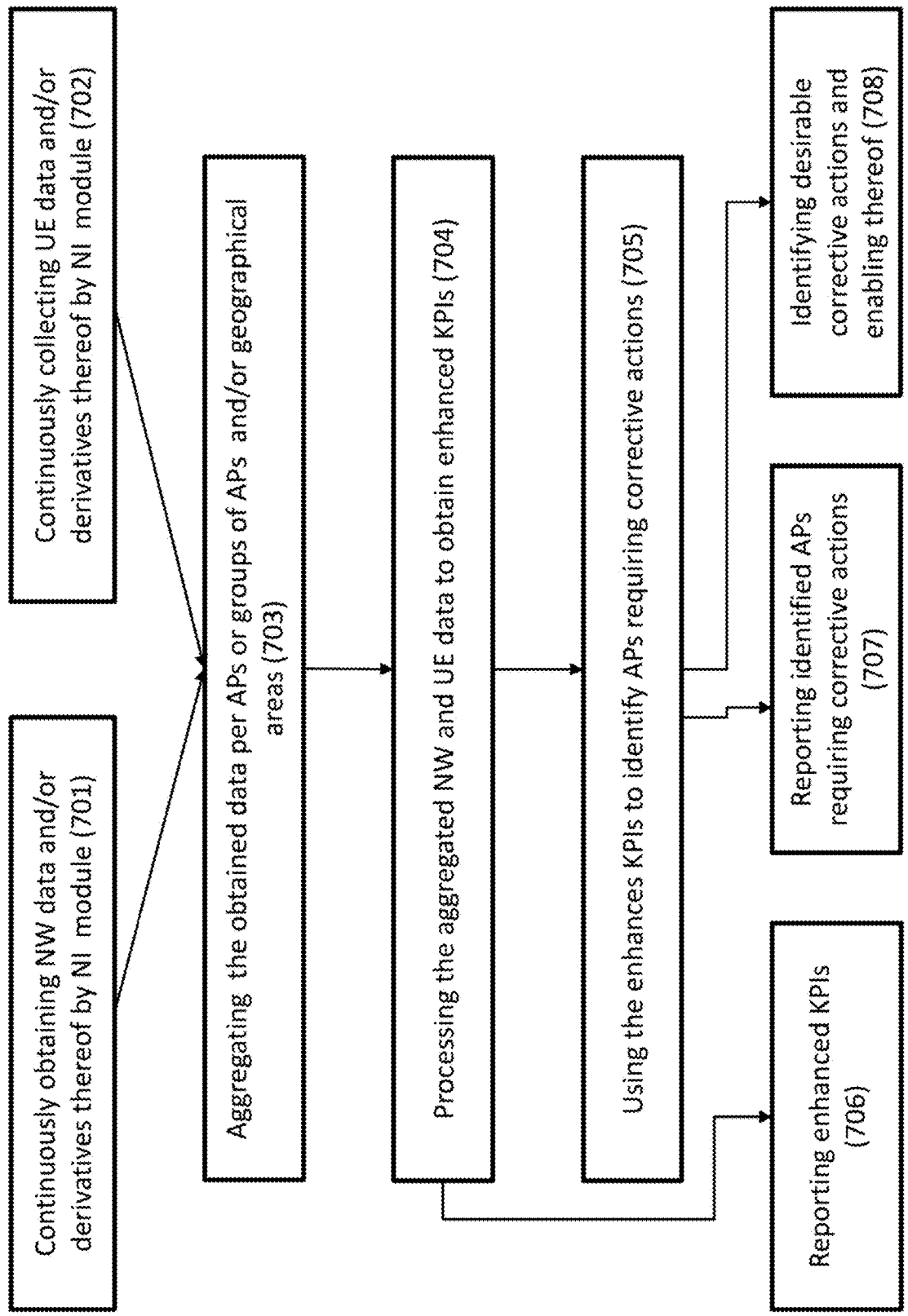
FIG. 7 illustrates a generalized flow diagram of operating the SON system in accordance with another certain embodiments of the presently disclosed subject matter.

Referring to FIG. 7, there is illustrated a generalized flow chart of operating the SON system in accordance with another embodiments of the presently disclosed subject matter.

NI module 101 continuously obtains (701) NW data informative of network performance. At least part of NW data can be derived by the NI module by aggregating and periodically parsing data collected from the one or more ND depositories 102.

NI module 101 continuously collects (702) UE data informative, at least, of network performance and UE location. In accordance with certain embodiments of the presently disclosed subject matter, a given UE of the plurality of UEs can send UE data to the NI module responsive to one or more triggering events specified by a policy received from NI module 101. By way of non-limiting example, triggering events related to a given UE can include changes of network connectivity, starts/ends of phone calls, connection to a car docking station, start/end of predefined period, etc. Depending on the triggering event, UE can collect data during a predefined period (e.g. responsive to a call, UE can collect UE data during the call; responsive to a start of periodical collection, UE can collect UE data during a predefined period, etc.)) or can report current state of the UE device (e.g. in response to connection or signal strength changes, etc.). Alternatively or additionally, the policy can specify that the given UE collects and/or reports data only when served by predefined APs and/or located in a predefined area. Alternatively or additionally, the policy can specify that the given UE (e.g. with the help of the UE agent)

provides some active measurements (e.g. active connectivity tests by sending ICMP ping requests), and reports the respective results.

NI module 101 aggregates (703) the NW and UE data obtained during a collection period. In certain embodiments NW data and UE data can be aggregated in separate statistical clusters. Aggregation criteria can be the same or, optionally, aggregation criteria for NW data can differ from aggregation criteria for UE data. By way of non-limiting example, NW data can be aggregated in statistical clusters per APs (or groups thereof), while UE data can be aggregated in statistical clusters per geographical areas (e.g. location bins and/or groups thereof).

In another embodiments, NW data and UE data can be aggregated in combined statistical clusters. Optionally, UE data can be aggregated with different weights depending on respective UE location and/or other context-related data. By way of non-limiting example, weights can depend on clients' priorities defined by a network operator (e.g. enterprise clients, youngsters, VIP clients, etc.), on a time of day (e.g. working hours), on UE location e.g. in a train or on a highway), UE status e.g. speed of moving, indoor/outdoor, etc.), applications running on UE during UE data collection, etc. Aggregating NW and UE data in a combined cluster (e.g. per geolocation) can comprise correlation between NW data associated with APs and UE data associated with both APs and geolocations.

Alternatively or additionally, data for statistical clusters can be aggregated by type of UE, time of day, services, predefined use cases (e.g. uplink/downlink balancing, hotspots identification, LTE footprint optimization, etc.), etc. It is noted that each statistical cluster shall comprise a statistically sufficient amount of data enabling desired statistical confidence. By way of non-limiting example, this requirement can be to achieved by tuning the duration of the collection period, aggregating the collected data together with prior obtained NW and/or UE data stored in database 204, using the stored NW and UE data to generate a statistical baseline, etc.

NI module 101 processes the aggregated data to obtain (704) key performance indicators generated in consideration of the obtained UE data, such indicators being referred to hereinafter as "enhanced KPIs".

When NW data have been aggregated separately from UE data, generating enhanced KPIs can comprise correlation between NW data clusters and UE data clusters prior to further processing thereof. By way of non-limiting example, such correlation can be provided using data informative of network topology and/or UE data associated both with serving/neighbouring APs and UE locations.

At least part of the enhanced KPIs can be configured as a single value representing results of processing statistical clusters with combined NW and UE data. Alternatively or additionally, at least part of the enhanced. KPIs can be configured as a single value representing a mathematical (e.g. weighted) combination of KPIs derived from NW data and KPIs separately derived from UE data. Alternatively or additionally, a given enhanced KPI can be configured as a combination of two values, respectively corresponding to NW KPI and UE KPI. Optionally, for the same collected data, NI module 101 can generate several enhanced KPIs corresponding to different use cases (e.g. with different weights for UE data in combined statistical clusters or different weights of UE KPIs separately derived from UE data).

Figure 4:
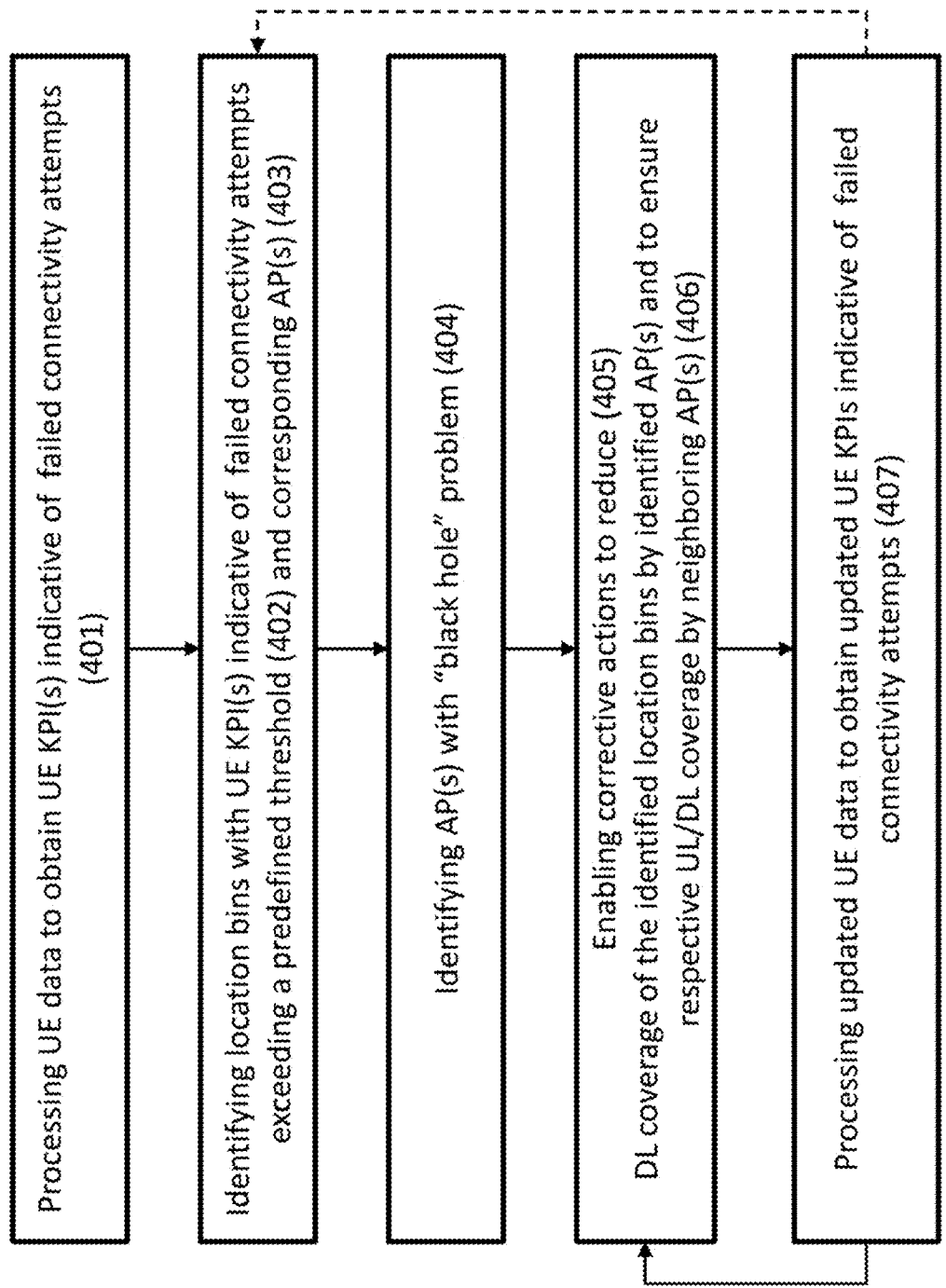
FIG. 4 illustrates a generalized flow diagram of a non-limiting example of operating the SON system in accordance with certain embodiments of the presently disclosed subject matter in an "access black hole" use case.

It is noted that the use cases detailed with reference to FIGS. 4 and 5 can be implemented with independently applicable NW KPIs and UE KPIs as detailed with reference to FIG. 6. Likewise, these use cases can be implemented with enhanced KPIs detailed with reference to FIG. 7.

SON system 121 can report (706) the enhanced KPIs to predefined network entities. Alternatively or additionally, SON system 121 can compare the generated enhanced KPIs with predefined thresholds. The thresholds for the same enhanced KPI can differ for different use cases and/or geographical areas. SON system 121 can alert respective network entities (e.g. OSS and/or administrator's work station) when one or more enhanced KPIs do not match the thresholds and, accordingly, are indicative of performance problem(s).

Optionally, SON system 121 further uses the obtained enhanced KPIs to identify (605) APs requiring corrective actions. SON system 121 can report (707) the identified APs requiring corrective actions to respective network entities (e.g. OSS). In certain embodiments, SON system 121 further identifies (708) the desirable corrective actions, generates provisioning scripts (or select pre-provisioned scripts) and enables the corrective actions accordingly.

It is noted that in the methods detailed with reference to FIGS. 4-7, the respective corrective actions can be defined with the help of rule-base model, machine learning, neural networks or any other appropriate technique using NW KPIs and UE KPIs as inputs, separately or in a combination. The collected data can be usable for training models for machine learning or artificial intelligence techniques. Likewise, these techniques can use UE KPIs and/or enhanced KIPs as feedback for the training process.

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of controlling traffic in a cellular network comprising a plurality of access points (APs) serving a plurality of user equipment devices (UEs), the method comprising: by a computerized system operatively connected to the plurality of APs and the plurality of UE devices, continuously obtaining network data (NW data) related to at least part of APs from the plurality of APs;

continuously obtaining, from the UE devices, user equipment data (UE data) related to at least part of the UEs from the plurality of UEs;

aggregating the NW data and the UE data into statistical clusters, wherein the NW data are aggregated into one or more NW statistical clusters using a first aggregation criterion and the UE data are separately aggregated into one or more UE statistical clusters using a second aggregation criterion different from the first aggregation criterion; or the NW data and the UE data are aggregated into one or more combined statistical clusters, wherein UE data are aggregated with weights different from the weights of aggregating the NW data; and continuously identifying at least one AP requiring corrective action by processing data informative of Network Key Performance Indicators (NW KPIs) and User Equipment Key Performance Indicators (UE KPIs), the data derived by processing the statistical clusters informative of NW data and UE data.

2. The method of claim 1 further comprising at least one of:
a. reporting the at least one identified AP requiring corrective actions to one or more predefined network entities;
b. identifying problems related to the at least one identified AP and alerting thereof to one or more predefined network entities;
c. identifying one or more desirable corrective actions with regard to the at least one identified AP; and
d. identifying desirable corrective actions with regard to the at least one identified AP and enabling thereof.

3. The method of claim 1, wherein the processing comprises deriving one or more NW KPIs from the one or more NW statistical clusters, deriving one or more UE KPIs from the one or more UE statistical clusters, correlating between the one or more NW KPIs and the one or more UE KPIs and processing the correlated KPIs to identify the at least one AP requiring corrective action, wherein the correlating comprises identifying NW KPIs that correspond to APs involved in one or more services characterized by the one or more UE KPIs.

4. The method of claim 1, further comprising enabling, with regard to the identified at least one AP, one or more corrective actions, wherein the one or more corrective actions improve one or more UE KPIs related to the identified at least one AP and keep deterioration of one or more NW KPIs related to the identified at least one AP as matching one or more predefined thresholds.

5. The method of claim 1, wherein the second aggregation criterion is related to UEs located in one or more predefined geographical areas and/or UEs moving with a speed exceeding a predefined threshold.

6. The method of claim 3, wherein the one or more NW KPIs and the one or more UE KPIs are indicative of different characteristics related to network performance.

7. The method of claim 3, wherein the one or more NW KPIs are indicative of network performance parameters, and the one or more UE KPIs are indicative of number of UEs respectively suffered from insufficient network performance.

8. The method of claim 1, wherein the processing comprises:
correlating between the one or more NW statistical clusters and the one or more UE statistical clusters, wherein the correlating is provided using, at least: data informative of network topology and/or UE data associated both with UE locations and APs serving the respective UEs, and/or UE data associated both with UE locations and APs neighboring APs serving the respective UEs;
deriving one or more NW KPIs from the one or more NW statistical clusters;
deriving one or more UE KPIs from the one or more UE statistical clusters;
generating one or more enhanced KPIs, wherein at least one enhanced KPI is configured as a single value representing a weighted combination of the one or more NW KPIs and one or more UE KPIs derived from respectively correlated statistical clusters; and
using the one or more enhanced KPIs to identify the at least one AP requiring corrective action.

9. The method of claim 8, wherein a weight of the one or more UE KPIs in the at least one enhanced KPI depends on a use case related to desirable corrective actions, the use case selected from: uplink/downlink balancing, hotspots identification, LTE footprint optimization.

10. The method of claim 1, wherein the processing comprises:
correlating between the one or more NW statistical clusters and the one or more UE statistical clusters, wherein the correlating is provided using, at least, data informative of network topology and/or UE data associated both with UE locations and APs serving the respective UEs;
deriving one or more NW KPIs from the NW statistical clusters; deriving one or more UE KPIs from the UE statistical clusters; and
generating one or more enhanced KPIs, wherein at least one enhanced KPI is configured as two values, one of the two values corresponding to the one or more NW KPIs and another of the two values, to respectively correlated one or more UE KPIs; and
using the one or more enhanced KPIs to identify the at least one AP requiring corrective action.

11. The method of claim 1, wherein the processing comprises generating one or more enhanced KPIs informative of both NW KPIs and UE KPIs and configured as a single value derived from the combined statistical clusters; and using the one or more enhanced KPIs to identify the at least one AP requiring corrective action.

12. The method of claim 1, wherein the weight of UE data when aggregated in the combined statistical clusters depends on a use case selected from: uplink/downlink balancing, hotspots identification, LTE footprint optimization.

13. A computerized system operatively connected to a plurality of APs operating in a cellular network and to a plurality of UE devices served by the plurality of APs, the computerized system comprising a computer configured to:
continuously obtain network data (NW data) related to at least part of APs from the plurality of APs;
continuously obtain, from the UE devices, user equipment data (UE data) related to at least part of the UEs from the plurality of UEs;
aggregate the NW data and the UE data into statistical clusters, wherein
the NW data are aggregated into one or more NW statistical clusters using a first aggregation criterion and the UE data are separately aggregated into one or more UE statistical clusters using a second aggregation criterion different from the first aggregation criterion; or
the NW data and the UE data are aggregated into one or more combined statistical clusters, wherein UE data are aggregated with weights different from the weights of aggregating the NW data; and
continuously identify at least one AP requiring corrective action by processing data informative of Network Key Performance Indicators (NW KPIs) and User Equipment Key Performance Indicators (UE KPIs), the data derived by processing the statistical clusters informative of NW data and UE data.

14. The computerized system of claim 13, wherein the processing comprises deriving one or more NW KPIs from the one or more NW statistical clusters, deriving one or more UE KPIs from the one or more UE statistical clusters, correlating between the one or more NW KPIs and the one or more UE KPIs and processing the correlated KPIs to identify the at least one AP requiring corrective action, wherein the correlating comprises identifying NW KPIs that correspond to APs involved in one or more services characterized by the one or more UE KPIs.

15. The computerized system of claim 13, further configured to enable, with regard to the identified at least one AP, one or more corrective actions, wherein the one or more corrective actions improve one or more UE KPIs related to the identified at least one AP and keep deterioration of one or more NW KPIs related to the identified at least one AP as matching one or more predefined thresholds.

16. The computerized system of claim 13, wherein the processing comprises:
    correlating between the one or more NW statistical clusters and the one or more UE statistical clusters, wherein the correlating is provided using, at least: data informative of network topology and/or UE data associated both with UE locations and APs serving the respective UEs, and/or UE data associated both with UE locations and APs neighboring APs serving the respective UEs;
    deriving one or more NW KPIs from the one or more NW statistical clusters;
    deriving one or more UE KPIs from the one or more UE statistical clusters;
    generating one or more enhanced KPIs, wherein at least one enhanced KPI is configured as a single value representing a weighted combination of the one or more NW KPIs and one or more UE KPIs derived from respectively correlated statistical clusters; and
    using the one or more enhanced KPIs to identify the at least one AP requiring corrective action.

17. The computerized system of claim 13, wherein the processing comprises:
    correlating between the one or more NW statistical clusters and the one or more UE statistical clusters, wherein the correlating is provided using,
    at least, data informative of network topology and/or UE data associated both with UE locations and APs serving the respective UEs;
    deriving one or more NW KPIs from the NW statistical clusters;
    deriving one or more UE KPIs from the UE statistical clusters; and
    generating one or more enhanced KPIs, wherein at least one enhanced KPI is configured as two values, one of the two values corresponding to the one or more NW KPIs and another of the two values, to respectively correlated one or more UE KPIs; and
    using the one or more enhanced KPIs to identify the at least one AP requiring corrective action.

18. The computerized system of claim 13, wherein the processing comprises generating one or more enhanced KPIs informative of both NW KPIs and UE KPIs and configured as a single value derived from the combined statistical clusters; and using the one or more enhanced KPIs to identify the at least one AP requiring corrective action.

19. The computerized system of claim 13, wherein the weight of UE data when aggregated in the combined statistical clusters depends on a use case selected from: uplink/downlink balancing, hotspots identification, LTE footprint optimization.

20. A non-transitory computer readable medium usable by a computerized system operatively connected to a plurality of APs operating in a cellular network and to a plurality of UE devices served by the plurality of APs, the computer readable medium comprising instructions that, when executed by a computer, cause the computer to perform operations comprising:
    aggregating into statistical clusters continuously obtained network data (NW data) related to at least part of APs from the plurality of APs and continuously obtained, from the UE devices, user equipment data (UE data) related to at least part of the UEs from the plurality of UEs, wherein
        the NW data are aggregated into one or more NW statistical clusters using a first aggregation criterion and the UE data are separately aggregated into one or more UE statistical clusters using a second aggregation criterion different from the first aggregation criterion; or
        the NW data and the UE data are aggregated into one or more combined statistical clusters, wherein UE data are aggregated with weights different from the weights of aggregating the NW data; and
    continuously identifying at least one AP requiring corrective action by processing data informative of Network Key Performance Indicators (NW KPIs) and User Equipment Key Performance Indicators (UE KPIs), the data derived by processing the statistical clusters informative of NW data and UE data.

* * * * *